United States Patent [19]

Periou

[11] Patent Number: 5,101,430
[45] Date of Patent: Mar. 31, 1992

[54] METHOD AND DEVICE FOR GENERATING AND FOR VALIDATING A DIGITAL MESSAGE AND APPLICATION OF SUCH A DEVICE

[75] Inventor: Pierre Periou, Cergy Pontoise, France

[73] Assignee: Rockwell International Corporation, Pittsburgh, Pa.

[21] Appl. No.: 580,026

[22] Filed: Sep. 10, 1990

[30] Foreign Application Priority Data

Sep. 20, 1989 [FR] France .................................. 89 12348

[51] Int. Cl.$^5$ .......................... H04K 1/00; H04L 9/02; H01H 27/10; G07D 7/00
[52] U.S. Cl. .................................... 380/23; 200/43.01; 235/27; 340/825.34; 380/42; 380/43; 380/48
[58] Field of Search ........................ 380/23, 42, 48, 43; 340/825.34; 200/43.01; 235/27

[56] References Cited

U.S. PATENT DOCUMENTS 4,317,957  3/1982  Sendrow .......................... 340/825.34
4,509,093  4/1985  Stellberger ............................ 380/23

Primary Examiner—Stephen C. Buczinski

[57] ABSTRACT

In this method, a number N is assigned to transmitted and receiving stations comprising synchronous clocks (2), the coded message being obtained by calculating a time Tie from the time elapsed since the initialization of the clock of the transmitting station, a code Ae1 from N and from Tie in accordance with a first relationship, a code Ae2 from Ae1 in accordance with a second relationship, and the coded message M from N, Tie and Ae2, in accordance with a third relationship. The validation operation is performed by calculating a time Tir1 from the time elapsed since the initialization of the clock of the receiving station, a code Ar1 from the received coded message M, from N and from Tir1, by using the third relationship, a code Ar2 from the n highest order bits of Ar1, n being the number of bits of Ae1, a code Ar3 from Ar2 in accordance with the second relationship, a time Tir2 from M, from N and from Ar3, by using the third relationship, and a code Ar4 from N and from Tir2 by using the first relationship, and by verifying that Ar2 is equal to Ar4 and that the absolute value of the difference Tir2−Tir1 is less than a specified threshold.

8 Claims, 3 Drawing Sheets

METHOD AND DEVICE FOR GENERATING AND FOR VALIDATING A DIGITAL MESSAGE AND APPLICATION OF SUCH A DEVICE

The present invention relates to a method and a device for generating and for validating a digital identification message from at least one station for transmitting this message towards a station for receiving this message, and an application of this device.

Numerous radiant systems for remote control, for example, by high frequency or by infrared, which transmit a password suited to be received and recognized by an appropriate receiver are already known in the state of the art.

These systems are for example used to ensure the locking or the unlocking of a door of, for example, a garage, house or automotive vehicle.

However, all the known systems bring greater reassurance than security and present at least one of the major disadvantages, namely the copying and the reproduction of the message or violability by systematic exploration ("scanning") which can be avoided only by a momentary blocking of the system.

In fact, there exist two main system types in the state of the art, one using fixed codes and the other, moving codes.

Fixed codes, like moving codes, that is to say with change of code after each use, are easily copied and explored.

In fact, for moving codes, knowledge of the operator enabling passage from the message Mn to the message Mn+1, which is kept secret by the manufacturer, is quickly obtained in the case of large series production, which renders illusory the security offered by these systems.

Moreover, their inevitable desynchronization enormously reduces the number of possible combinations.

Moving codes with change of code from time to time are copyable and reproducible for a certain time and are all the more explorable the longer is the period between two code changes.

The aim of the invention is therefore to resolve these problems by proposing a method and a device for generating and for validating a digital message for identification of a transmitting station which enables identification of a station for transmitting this message, for example from a certain number of possible stations, and which is not susceptible to copying, reproduction, exploration or even determination by knowledge of several messages and of the operator.

To this end, the subject of the invention is a method for generating and for validating a digital message for identification of at least one station for transmitting this message towards a station for receiving this message, characterized in that these transmitting and receiving stations comprise clocks, at least approximately synchronous, an arbitrary number N is assigned to these stations, in that the coded message is obtained in the transmitting station by:

a) calculating a first time Tie from the time elapsed since the initialization of the clock of this transmitting station, possibly taking into account the time elapsed between the initialization of this clock and that of the clock of the receiving station, if these initializations were not simultaneous, b) calculating a first code Ae1 from N and from Tie in accordance with a first relationship, c) calculating a second code Ae2 from the first code Ae1 in accordance with a second relationship, d) calculating the coded message M from N, Tie and Ae2, in accordance with a third relationship, and in that the validation operation is performed, in the receiving station, by:

e) calculating a second time Tir1 from the time elapsed since the initialization of the clock of the receiving station, possibly taking into account the time elapsed between the initialization of this clock and that of the clock of the transmitting station, if these initializations were not simultaneous and in the case where account was not taken of this time for the calculation of Tie, f) calculating a third code Ar1 from the received coded message M, from N and from Tir1, by using the third relationship, g) calculating a fourth code Ar2 from the n highest order bits of the code Ar1, which are not affected by the drift of the clocks of the transmitting and receiving stations, n being the number of bits of the first code Ae1, h) calculating a fifth code Ar3 from the fourth code Ar2 in accordance with the second relationship, i) calculating a third time Tir2 from the received coded message M, from N and from Ar3, by using the third relationship, j) calculating a sixth code Ar4 from N and from Tir2 by using the first relationship, and k) by verifying that the code Ar2 is equal to the code Ar4 and that the absolute value of the difference Tir2−Tir1 is less than a specified threshold, in order to validate the identification.

According to another aspect, the subject of the invention is also a device for the implementation of the method as previously described, characterized in that the emitting and receiving stations each comprise a calculator connected to a memory for storing each assigned number N and to a clock.

According to another aspect, the subject of the invention is also an application of the device as previously described, to the control of the locking and of the unlocking of at least one automotive vehicle door lock, in which the transmitting station is autonomous and the receiving station is disposed inside the vehicle, the validation of the identification message triggering the control of the locking or of the unlocking of the lock.

The invention will be better understood with the aid of the description which follows, given merely by way of example and made with reference to the attached drawings, in which.

Figure 1:
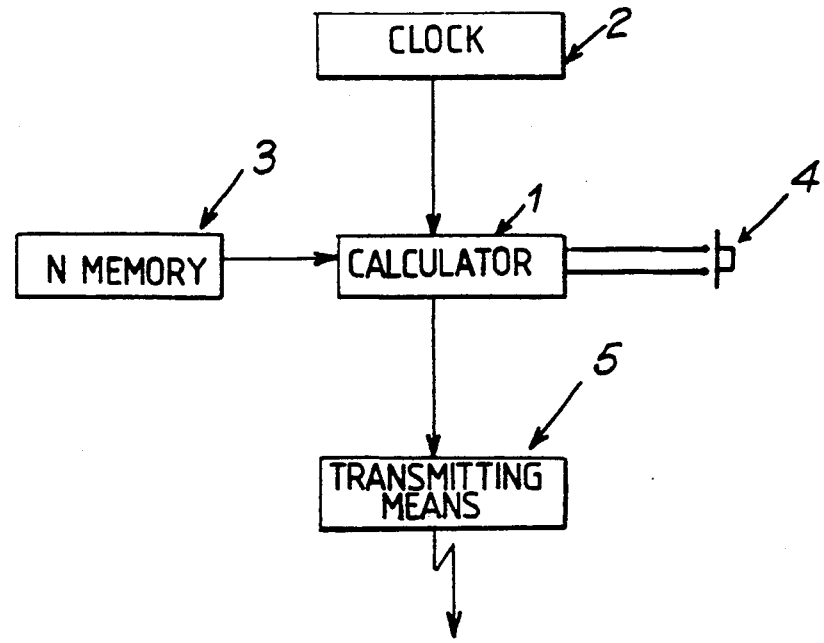
FIG. 1 shows a synoptic diagram of an embodiment of a transmitting station forming part of a generating and validating device according to the invention.

As can be seen in FIG. 1, a transmitting station forming part of a device according to the invention comprises a calculator 1 connected to a clock 2 and to a memory 3 for storing an arbitrary number N assigned to this transmitting station.

This calculator is also connected to a unit 4 for triggering the transmission of a digital message for identification of this station, this unit being constituted by, for example, a push-button, and to means for transmitting this message towards a receiving station.

The generation of the digital message for identification of this transmitting station is obtained through the various steps of the method described below.

Firstly, the calculator 1 calculates a first time Tie from the time elapsed since the initialization of the clock of this transmitting station.

Possibly, and as will be described in more detail further on, during this calculation the calculator may take account of the time elapsed between the initialization of this clock of the transmitting station and that of the clock of an associated receiving station, if these initializations were not simultaneous.

After the calculation of this first time Tie, the calculator 1 calculates a first code Ae1 from N and from Tie in accordance with a first relationship.

By way of example, this first code Ae1 may be calculated from the arbitrary number N assigned to this transmitting station and from the time Tie, which are given below in digital form, by a reversible operation, the write operation being decimal.

$$
\begin{array}{lllllllll}
N & & n1 & n2 & n3 & n4 & n5 & n6 \\
Tie & = t1 & t2 & t3 & t4 & t5 & t6 & t7 & t8 \\
Ae1 & = |\Sigma ni - \Sigma ti| & & (t7\ t8\ +1)
\end{array}
$$

The code Ae1 then takes the form of an exceptionally zero number with four digits and with rapid and erratic variation, represented by:

$$Ae1 = a1\ a2\ a3\ a4$$

From this code Ae1 and in accordance with a second relationship, the calculator calculates a second code Ae2 by, for example, putting the code Ae1 end to end twice, as indicated below:

$$Ae2 = a1\ a2\ a3\ a4\ a1\ a2\ a3\ a4$$

After these various calculations, the calculator calculates a coded message M from N, from Tie and from Ae1 in accordance with a third relationship which may, for example, be an addition of the various elements mentioned previously.

In this case, this operation takes the following form:

$$
\begin{array}{lllllllll}
N & & n1 & n2 & n3 & n4 & n5 & n6 \\
Tie & = +t1 & t2 & t3 & t4 & t5 & t6 & t7 & t8 \\
\underline{Ae2} & \underline{= +a1} & \underline{a2} & \underline{a3} & \underline{a4} & \underline{a1} & \underline{a2} & \underline{a3} & \underline{a4} \\
M & = m1 & m2 & m3 & m4 & m5 & m6 & m7 & m8
\end{array}
$$

Figure 2:
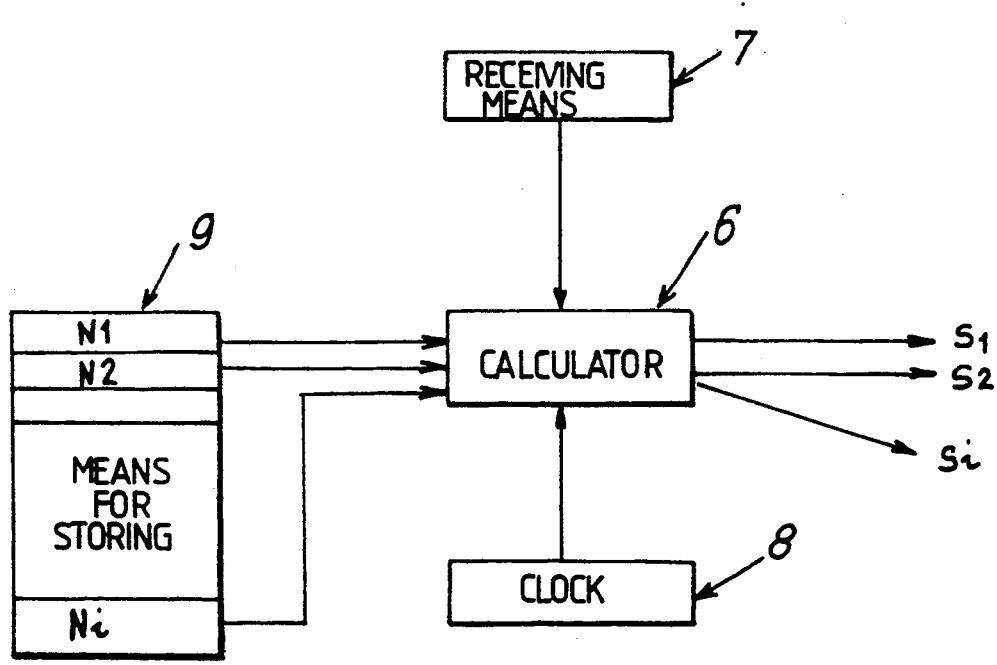
FIG. 2 shows a synoptic diagram of a first embodiment of a receiving station forming part of a device according to the invention.

This message is then transmitted by the calculator 1 to the transmitting means 5 of this transmitting station, these means being charged with transmitting this message in an arbitrary form towards receiving means of a receiving station the synoptic diagram of an embodiment of which is given in FIG. 2.

In this FIG. 2, it may be noted that the receiving station comprises a calculator 6 connected to means 7 for receiving the coded message, to a clock 8 and to means for storing 9 the number N assigned to the transmitting station.

Of course, the clocks of the transmitting and receiving stations are at least approximately synchronous. Several transmitting stations may be associated with this receiving station, these transmitting stations then being assigned different identification numbers N likewise introduced into the storage means 9 of the receiving station, to enable the validation of a message coming from one or other of these stations.

In the embodiment described in relation with this FIG. 2, it is assumed that the clocks of the transmitting and receiving stations are initialised at the same instant.

In this case, the calculator 6 calculates a second time Tir1 from the time elapsed since the initialization of the clock of this receiving station.

Following this calculation of Tir1, the calculator calculates a third code Ar1 from the received coded message M, from a chosen number N in the memory 9 and from the time Tir1, by using the third relationship described previously.

In the example described, this operation may then be written:

$$
\begin{array}{lllllllll}
M & = & m1 & m2 & m3 & m4 & m5 & m6 & m7 & m8 \\
N & = - & & n1 & n2 & n3 & n4 & n5 & n6 \\
\underline{Tir1} & \underline{= -t1} & \underline{t2} & \underline{t3} & \underline{t4} & \underline{t5} & \underline{t6} & \underline{t7} & \underline{t8} \\
Ar1 & = & a1 & a2 & a3 & a4 & a5 & a6 & a7 & a8
\end{array}
$$

The third relationship which was, for the generation of the identification message M, an addition of the terms N, Tie and Ae2, now becomes a subtraction from M of one of the numbers N taken from the memory 9 and of Tir1 obtained from the clock 8 of the receiving station.

The message obtained Ar1 comprises eight digits a1 to a8 respectively. The calculator 6 of the receiving station then calculates a fourth code Ar2 from the n highest order bits of the code Ar1, n being the number of bits of the first code Ae1 mentioned previously. The n highest order bits of the code Ar1 are not affected by the possible drift of the clocks of the transmitting and receiving stations, which enables obtainment of a code equivalent to the code Ae1 described previously.

This code Ar2 then takes up again, for example, the first four bits a1 to a4 of the code Ar1, from which the calculator 6 calculates a fifth code Ar3 in accordance with the second relationship mentioned previously, that is to say for example by reproducing this code Ar2 end to end twice. The code Ar3 then takes the following form:

$$Ar2 = a1\ a2\ a3\ a4$$

$$Ar3 = a1\ a2\ a3\ a4\ a1\ a2\ a3\ a4$$

Following this operation, the calculator 6 of the receiving station calculates a third time Tir2 from the received coded message M, from the selected number N and from Ar3 by using the third relationship. This then takes the following form:

$$
\begin{array}{lllllllll}
M & = & m1 & m2 & m3 & m4 & m5 & m6 & m7 & m8 \\
N & = - & & n1 & n2 & n3 & n4 & n5 & n6 \\
\underline{Ar3} & \underline{= -a1} & \underline{a2} & \underline{a3} & \underline{a4} & \underline{a1} & \underline{a2} & \underline{a3} & \underline{a4} \\
Tir2 & = & t1 & t2 & t3 & t4 & t5 & t6 & t7 & t8
\end{array}
$$

The calculator may then calculate a sixth code Ar4 from N and from Tir2 by using the first relationship mentioned previously, as follows:

$$Ar4 = |\Sigma ni - \Sigma ti|\ (t7\ t8 + 1)$$

To validate the identification, the calculator then verifies that the code Ar2 is equal to the code Ar4 and that the absolute value of the difference Tir2−Tir1 is less than a specified threshold, this threshold able to be related, as will be described in more detail further on, to a realistic drift of the clocks.

Of course, in the case of lack of correspondence between the codes for the number N selected, the calculator carries out an attempt at validation for each number N.

It is therefore seen that the calculator of the receiving station carries out a calculation of a first code from the information of the coded message, from a number N in memory and from the time elapsed since the initialization of its own clock.

It then carries out a second calculation to determine through another route, and from information drawn from the information mentioned previously for the first calculation, a second code which is compared to the first to validate the message in the case of correspondence.

The receiving station may likewise be equipped with means for storing, for each associated transmitting station, the time Tir2 calculated at the time of the previous message received from this station. During the validation of the following message, the calculator compares the time Tir2 calculated from the information contained in the received message, to the time Tir2 stored in memory, that is to say to the time Tir2 calculated from the previous message, so as to validate the identification only if the time Tir2 calculated from the information contained in the received message is greater than the stored time Tir2, corresponding to the time calculated from the previous message.

These two times may likewise be used to calculate the specified threshold mentioned previously, for example in accordance with the relationship calculated Tir2 stored Tir2 divided by 100 000.

It has previously been mentioned that, in the example described, the clocks of the transmitting and receiving stations are simultaneously initialised.

It goes without saying that these initializations may also be shifted in time and that there is then reason to take account of this shift for the various calculations.

Figure 3:
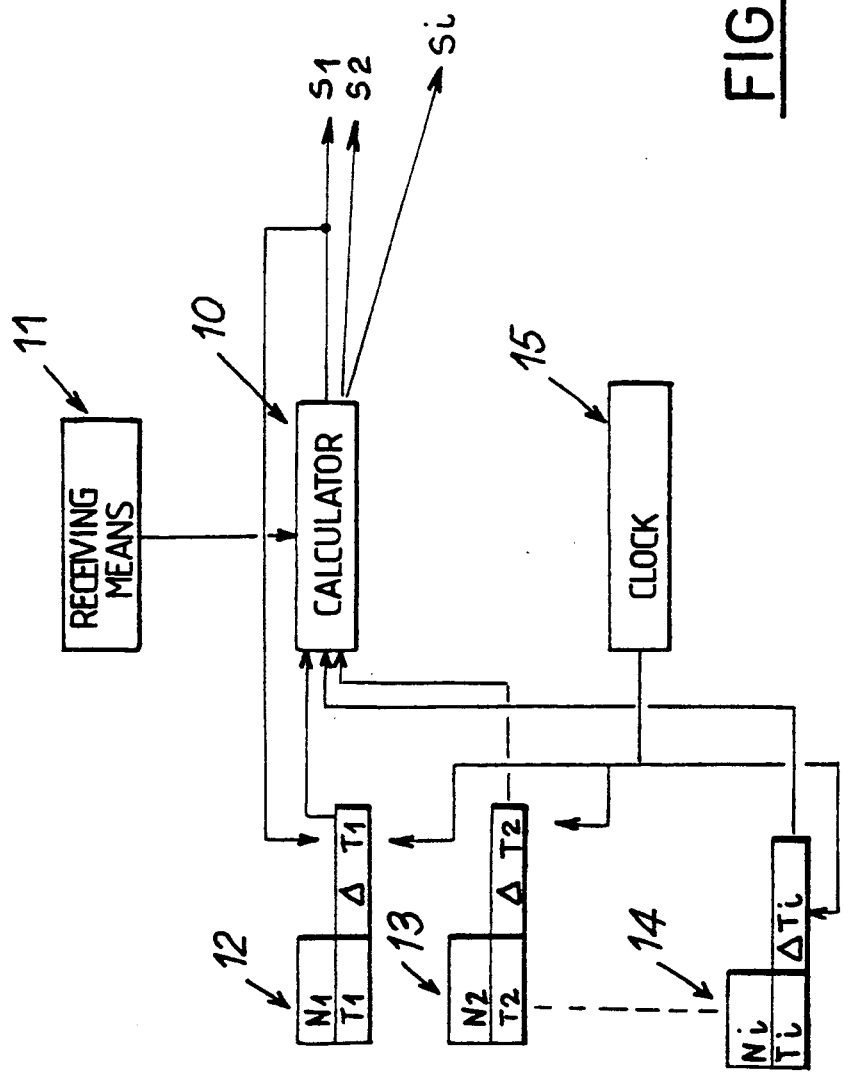
FIG. 3 shows a synoptic diagram of a second embodiment of a receiving station forming part of a device according to the invention.
Figure 4:
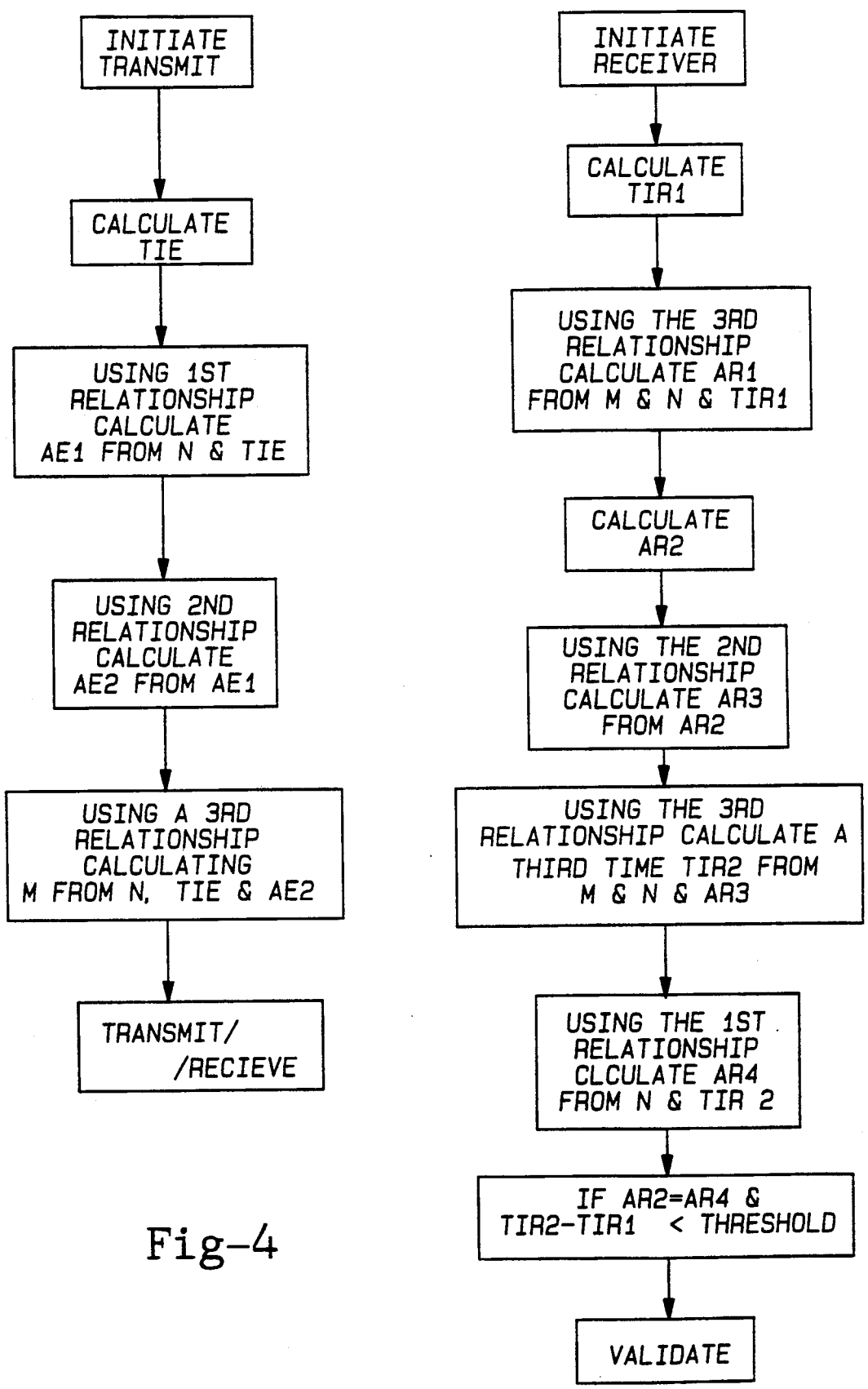
FIG. 4 shows a flow diagram of the method implemented according to the present invention.

An embodiment of a receiving station suited to taking account of this shift has been shown in FIG. 3.

This receiving station again comprises a calculator 10 connected to means for receiving the coded message 11.

This calculator 10 is also connected to a series of storage means, for example 12, 13 and 14 which are assigned, for example, to various transmitting stations, storing, for each station, a number N assigned to this station, the last Tir2 calculated for this station and an interval ΔT representing the time elapsed since receiving the last message from this transmitting station.

A clock 15 enables these interval ΔT counters to be updated again.

As a variant, this receiving station may be equipped with means for storing the time elapsed between the initialization of the associated transmitting stations and the receiving station to provide a shift reference for the various calculations.

In all cases, during the various calculations, the calculator of the receiving station takes account of this shift between the initializations of the clocks of the transmitting and receiving stations, if there is one, to coherently calculate times and correctly validate the message.

It also goes without saying that this shift between the initialization of the clock of the transmitting station or of the associated transmitting stations and that of the clock of the receiving station, may be taken into account in respect of the calculation of the first time Tie by the calculator of the transmitting station and that this calculator may then be connected to means for storing this shift.

In the two embodiments of the receiving station which are shown in FIGS. 2 and 3, the outputs S1 to Si of the calculator are used to afford various controls, for example of mechanical or other units following the validation of the message Thus, for example, the device shown in these Figures may be used for the control of the locking and of the unlocking of at least one automotive vehicle door lock, in which the or each transmitting station is autonomous and the receiving station is disposed inside the vehicle, the validation of the identification message triggering the control of the locking or of the unlocking of the lock.

Of course, other uses may be envisaged, like for example access of an enquiry terminal to a database, etc.

I claim:

1. Method for generating and for validating a digital message M for identification of at least one station and for transmitting this message towards a station for receiving this message, characterized in that these transmitting and receiving stations comprise clocks, at least approximately synchronous, said stations having an arbitrary number N assigned thereto; whereby a digital message is generated in the transmitting station by:
    a) calculating a first time Tie from the time elapsed since an initialization of the clock of a transmitting station, compensating for the time elapsed between the initialization of this clock and that of the clock of the receiving station, if these initializations were not simultaneous,
    b) calculating a first code Ae1 from N and from Tie in accordance with a first relationship,
    c) calculating a second code Ae2 from the first code Ae1 in accordance with a second relationship,
    d) calculating the coded message M from N and Tie and Ae2, in accordance with a third relationship,
    e) transmitting the message from transmitting station to a receiving station, and whereby a validation operation in the receiving station is performed by
    f) calculating a second time Tir1 from the time elapsed since the initialization of the clock of the receiving station, compensating for the time elapsed between the initialization of this clock and that of the clock of the transmitting station, if these initializations were not simultaneous or where account was not taken of this time for the calculation of Tie,
    g) calculating a third code Ar1 from the received coded message M, from N and from Tir1, by using the third relationship,
    h) calculating a fourth code Ar2 from the n highest order bits of the code Ar1, which are not affected by the drift of the clocks of the transmitting and receiving stations, n being the number of bits of the first code Ae1,
    i) calculating a fifth Ar3 from the fourth code Ar2 in accordance with the second relationship,
    j) calculating a third time Tir2 from the received coded message M, from N and from Ar3, by using the third relationship,
    k) calculating a sixth code Ar4 from N and from Tir2 by using the first relationship, and
    l) performing a comparison to verify that the code Ar2 is equal to the code Ar4 and that the absolute value of the difference Tir2−Tir1 is less than a specified threshold, in order to validate the identification.

2. Method according to claim 1, characterized in that several transmitting stations may be associated with one receiving station, each transmitting station and receiving station having a respectively assigned number N different from other respective transmitting and receiving stations, and in that an attempt at validation of a received message is carried out for each number N assigned.

3. Method according to claim 1, characterized in that the receiving station stores, for each transmitting station, the last time Tir2 calculated.

4. Method according to claim 3, characterized in that during the validation, time Tir2 calculated from the data contained in the received message is compared to stored time Tir2, corresponding to that calculated from the previous message and the identification is validated if time Tir2 calculated is greater than time Tir2 stored.

5. Method according to claim 4, characterized in that the specified threshold is equal to calculated Tir2 minus stored Tir2 divided by 100,000.

6. Device for the implementation of the method according to claim 1, characterized in that the transmitting and receiving stations each comprise a calculator connected to a memory for storing each assigned number N and to a clock.

7. Device according to claim 6, characterized in that each transmitting station and receiving station comprises means for storing the time elapsed between the initialization of the clock of the transmitting station and that of the clock of the receiving station.

8. Device according to claim 6, characterized in that the receiving station comprises means for storing the last time Tir2 calculated for each transmitting station and means for counting and storing the time elapsed since receiving the last message from the corresponding transmitting station.

* * * * *